United States Patent [19]

Hamada et al.

[11] Patent Number: 4,674,181
[45] Date of Patent: Jun. 23, 1987

[54] WORKING/ASSEMBLING SYSTEM

[75] Inventors: Toyohide Hamada; Hisaaki Hirabayashi, both of Yokohama, Japan

[73] Assignee: Hitachi, Ltd., Tokyo, Japan

[21] Appl. No.: 840,197

[22] Filed: Mar. 17, 1986

Related U.S. Application Data

[63] Continuation of Ser. No. 612,654, May 21, 1984, abandoned, which is a continuation of Ser. No. 274,677, Jun. 17, 1981, abandoned.

[30] Foreign Application Priority Data

Jun. 18, 1980 [JP] Japan ................................ 55-81453

[51] Int. Cl.⁴ ..................... B23P 21/00; B23P 19/00; B23Q 15/00
[52] U.S. Cl. ................................... 29/703; 29/33 P; 29/33 K; 29/430; 29/431; 29/712; 29/714; 29/720; 29/791; 29/799; 29/824; 198/341; 198/339.1; 414/753; 414/226; 901/7
[58] Field of Search ................ 29/33 P, 33 K, 703, 29/709, 711, 712, 714, 720, 791, 793, 795, 799, 822, 823, 824, 429, 430, 431; 198/339, 341, 472; 414/749, 751, 753, 222, 225, 226; 901/7

[56] References Cited

U.S. PATENT DOCUMENTS

| | | | |
|---|---|---|---|
| 3,272,347 | 9/1966 | Lemelson | 414/728 |
| 3,283,918 | 11/1966 | Devol | 198/341 |
| 3,302,803 | 2/1967 | Mooney | 414/751 |
| 3,372,568 | 3/1968 | Lemelson | 29/33 P |
| 3,422,967 | 1/1969 | Aron | 414/753 |
| 3,628,674 | 12/1971 | Koike | 414/751 |
| 3,796,327 | 3/1974 | Meyer et al. | 414/222 |
| 3,854,889 | 12/1974 | Lemelson | 29/33 P |
| 3,958,682 | 5/1976 | Martin | 198/341 |
| 3,968,559 | 7/1976 | Karlsson | 29/430 |
| 4,034,465 | 7/1977 | Shelton | 29/426.3 X |
| 4,309,600 | 1/1982 | Perry et al. | 29/33 P X |
| 4,369,563 | 1/1983 | Williamson | 29/563 X |

FOREIGN PATENT DOCUMENTS 200064  3/1983  Fed. Rep. of Germany ........ 29/703
140280  5/1975  Japan .

OTHER PUBLICATIONS

European Search Report, Document EP-81-30-2724.

Primary Examiner—Howard N. Goldberg
Assistant Examiner—Ronald S. Wallace
Attorney, Agent, or Firm—Antonelli, Terry & Wands

[57] ABSTRACT

A working/assembling system including a closed loop endless track, moving units adapted to travel on the endless track, at least one robot supported on one of the moving units for a working or assembling operation, and a control unit mounted on the other moving unit connected to the one moving unit having stored therein operations to be performed by the robot and causing the robot to perform the operations. The robot moves on the moving units as the latter travel on the endless track, and performs the operations for working on workpieces or assembling parts as it is controlled by the control unit.

6 Claims, 8 Drawing Figures

FIG.I.
PRIOR ART

WORKING/ASSEMBLING SYSTEM

This is a continuation of application Ser. No. 612,654, filed May 12, 1984, now abandoned, which is a continuation of Ser. No. 274,677, filed June 17, 1981, now abandoned.

FIELD OF THE INVENTION

This invention relates to working/assembling systems, and, more particularly, to a working/assembling system that handles a variety of types of articles produced in small numbers.

DESCRIPTION OF THE PRIOR ART

A number of problems have been raised with regard to a production system in which a large number of types of articles are produced in small numbers and handled in an assembly line, because such production system has a higher incidence of switching between the types of articles produced than a production system in which a small number of types of articles are produced on a mass production basis and assembled in an assembly line. More specifically, when one type of articles is switched to another type, it is essential to effect replacement of devices and parts of the assembly line and to switch the operation steps each time switching of the types of the articles produced is effected. This makes it necessary to set up new plans for the new production steps, causing a reduction in yield and production of defective articles.

Under these circumstances, it has been impossible to develop an effective production system and automatic production facilities in this production system. Thus, the production system dealing with a large number of articles produced in small numbers has lagged in automation of assembling system behind the production system dealing with a small number of types of articles produced on a mass production basis.

Figure 1:
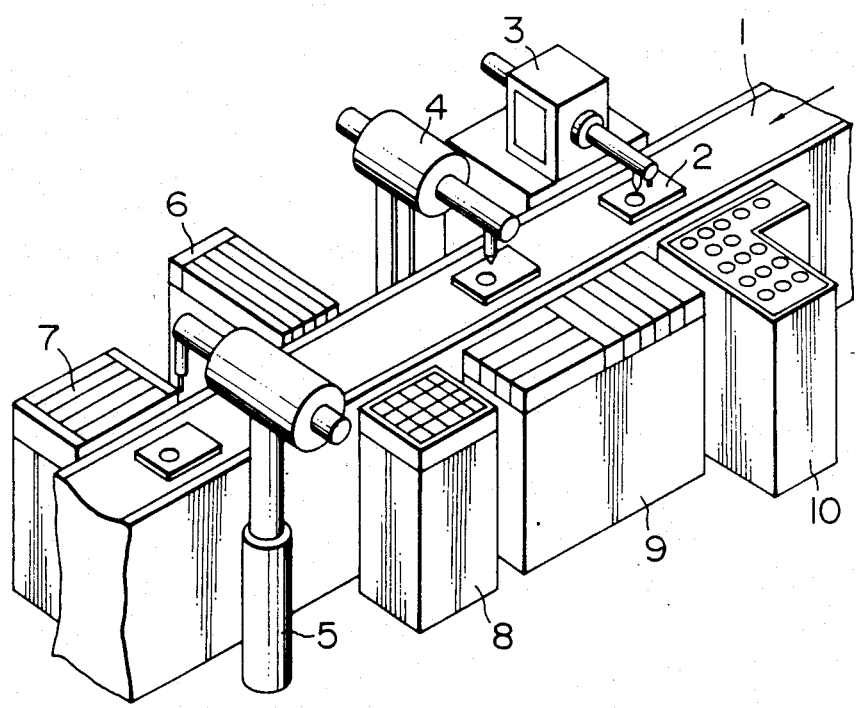
FIG. 1 is a perspective view of an assembling system of the prior art.

However, the production of articles of a large number of types has in part been automated. For example, FIG. 1 shows an in-line assembling system including an assembly conveyor 1, assembling units 3, 4 and 5 located on both sides of the assembly conveyor 1, and parts supply units 6, 7, 8, 9 and 10 located on both sides of the assembly conveyor 1 for assembling parts to be assembled by the respective assembling units. Platens 2 are conveyed, stopped and positioned on the assembly conveyor 1.

As the platens 2 are conveyed in the direction of an arrow, they are stopped and positioned in front of the assembling units 3, 4 and 5 which pick up parts supplied by the parts supply units 6, 7, 8, 9 and 10 and assemble then on each platens 2, so that the parts of a product can be assembled.

In the assembling system of the prior art, each assembling unit 1 handles one part. Thus, when the article has a large number of types, it is necessary to use the same number of assembling units and parts supply units as the number of types of article, and assembling of articles of a large number of types requires a large space for performing an operation. Thus, assembling of these articles is not economical.

When the platen 2 shown in FIG. 1 is conveyed between the assembling units 3 and 4 and 5, no assembling of parts on the parts already assembled on the platen 2 is performed. That is, the time for transfer of the platen 2 from one assembling unit to another creates no added value in the article. In the production system of the prior art handling articles of a large number of types, the ratio of the transfer time to assembling increases, resulting in an increase in cycle time. It is a serious problem than the transfer time creating no added value in the articles increases in assembling articles of a large number of types.

Moreover, in the production system of the prior art, difficulties have been encountered in coping with variations in the number of articles produced, particularly with an increase therein. More specifically, in FIG. 1, the assembling units 3-5 have limits in their assembling capabilities. When an increase in the number of articles produced is beyond the capabilities of the existing assembling units 3-5, an additional assembly line of the type shown in FIG. 1 must be provided. This is uneconomical because the plant space for the additional assembling units must be provided.

SUMMARY OF THE INVENTION

This invention has been developed for the purpose of obviating the aforesaid disadvantages of the prior art. Accordingly, the invention has as its object the provision of a working/assembling system which enables a cycle time to be reduced by decreasing the ratio of the transfer time to the overall assembly time, and which is capable of readily coping with a variation in the number of articles produced, so that assembling of the articles of a large number of types can be carried out economically by incorporating automation in the system.

To accomplish the aforesaid object, the working/assembling system according to the invention employs a versatile robot having a plurality of degrees of freedom capable of handling parts of a large number of types, in place of the assembling units hitherto used exclusively for handling specific parts. The robot is provided with assembling jigs and mounted on a moving unit, and a control unit including drive circuits for driving drive sources for driving various axes of the robot, and a power source is mounted on another moving unit connected to the first-mentioned moving unit and adapted to travel on a track. The robot can be moved together with the travelling moving units to carry out working or assembling.

The working/assembling system of the aforesaid construction according to the invention may further include a memory for storing information on operations to be performed by the robot as taught, and a controller for retrieving the necessary items of information from the memory for controlling the drive sources for driving various axes of the robot, so as to minimize the transmission and reception of signals between the control unit and a concentrated control unit mounted outside the system.

In the working/assembling system of the aforesaid construction according to the invention, the robot or moving unit may be provided with an assembling jig for performing an interfitting assembling operation or a working jig for removing burrs, for example, so that an assembling a working operation can be carried out while the parts are being transferred from one station to another, to eliminate the transfer time and shorten the cycle time. At the same time, conveyor means, by which products being assembled or worked, are transported can be eliminated by increasing the precision with which synchronization of the robot with the supply of the parts is obtained.

By forming the track for the robot to travel thereon in a closed loop, it is impossible to eliminate interference between the robots and to cope with an increase in the number of articles produced by merely increasing the number of robots, without increasing other peripheral units, when the number of articles produced exceeds the capabilities of one robot.

DETAILED DESCRIPTION OF THE PREFERRED EMBODIMENTS

Figure 2:
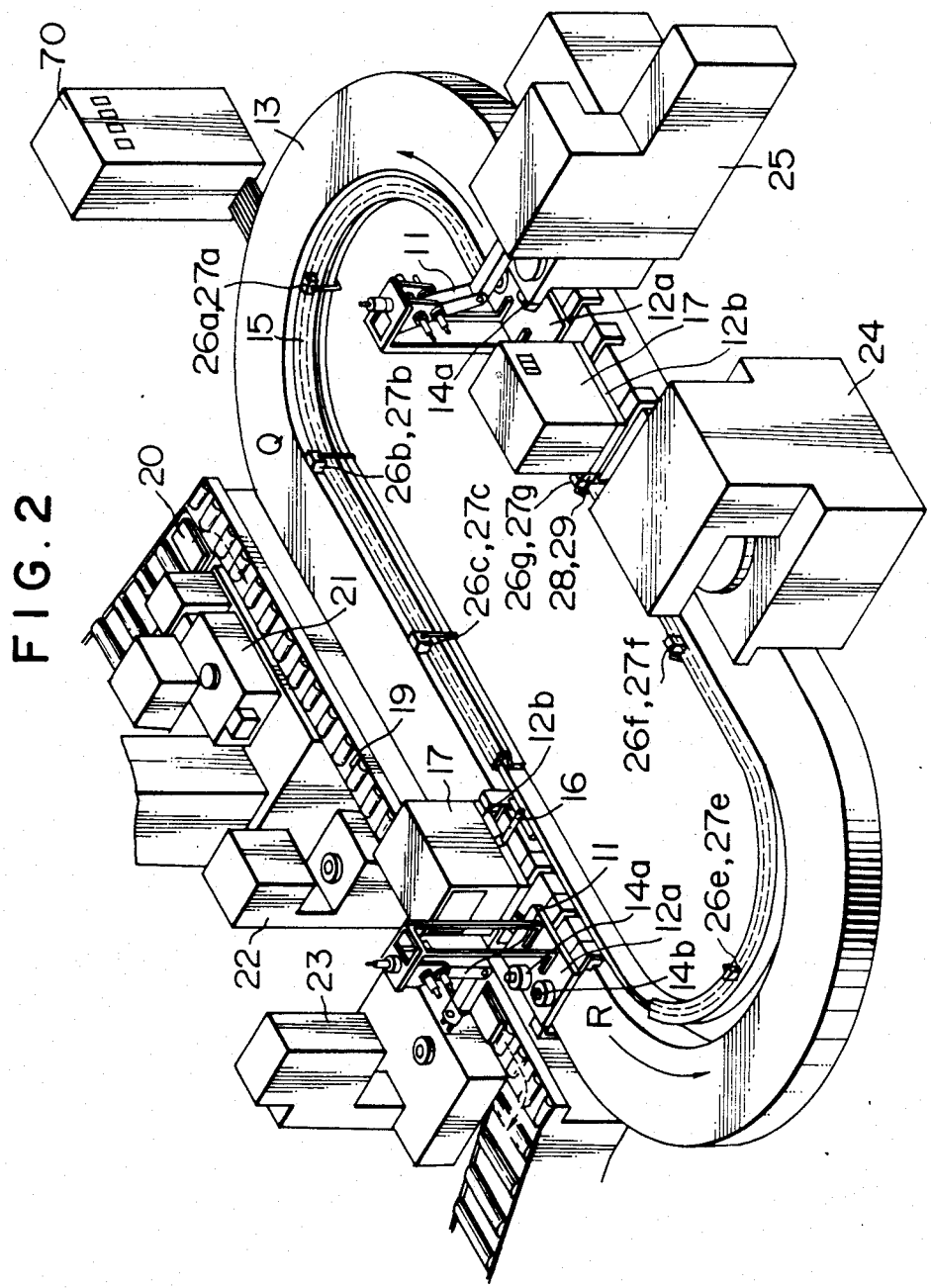
FIG. 2 is a perspective view of the working/assembling system according to one embodiment of the invention.
Figure 3:
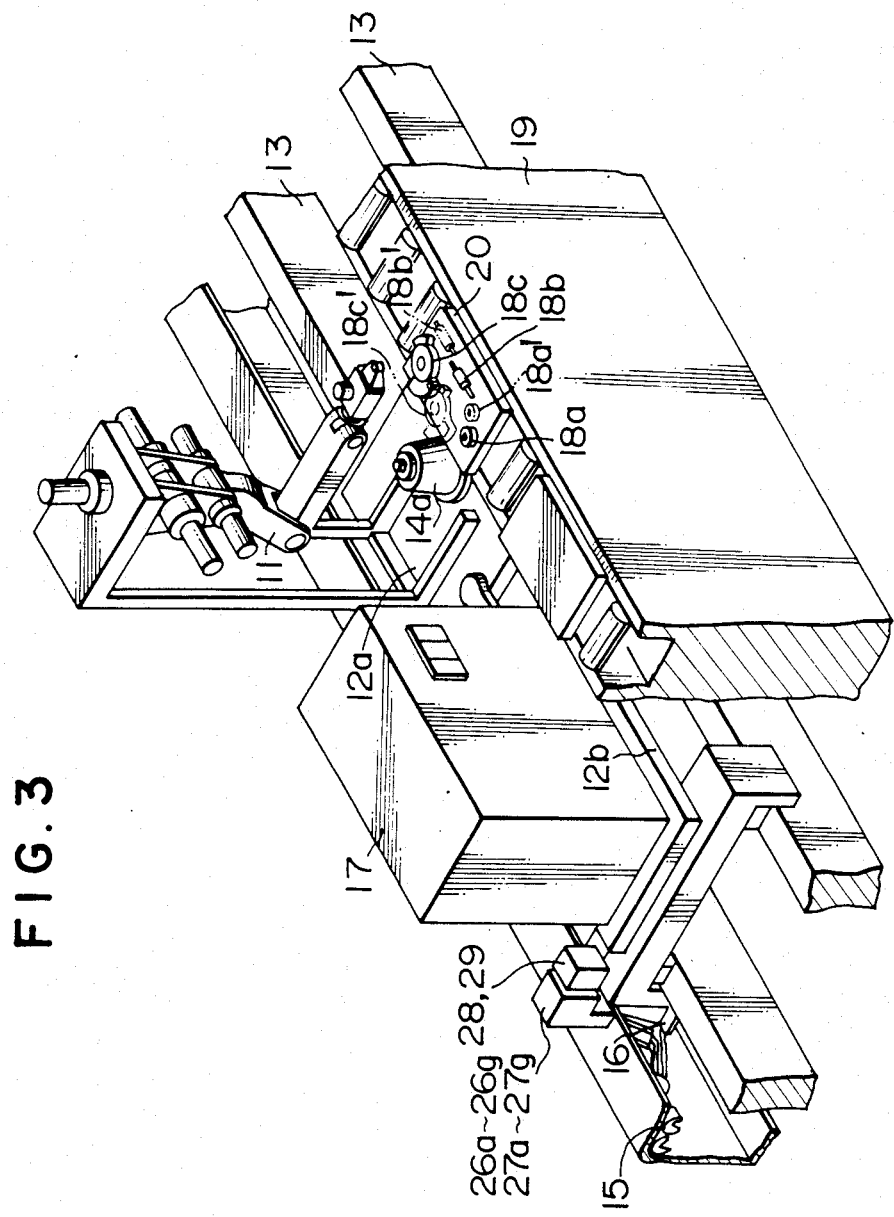
FIG. 3 is a perspective view, on an enlarged scale, of the moving units, robot and control unit shown in FIG. 2.

Referring to FIG. 2, a robot 11, of the articulated type having five degrees of freedom is located on a moving unit 12 which travels on a closed loop track 13. Assembling jigs 14, 14a, 14b are located on a moving unit 12a to enable the robot 11 to perform an assembling or working operation even while travelling. Since the robot 11 travels on a closed loop track 13, it is impossible to supply power through wires as is usually done. Thus, as shown in FIGS. 2 and 3, power supply wires 15 are arranged in a closed loop like the track 13 and are connected to collectors 16 located on the moving unit 12b.

A control unit 17 is mounted on the moving unit 12b, connected to a moving unit 12a supporting the robot 11, so as to control the robot 11 and moving units 12a, 12b by power supplied through the collectors 16.

Parts or components 18a, 18b, 18c; 18a', 18b', 18c' to be used in the assembly or working operation are located on a tray 20 which is adapted to be conveyed by a tray conveyor 19. The moving unit 12a and tray 20 are readily detachable, to enable the robot 11 to handle the parts or components 18a, 18b, 18c; 18a', 18b', 18c' on the tray 20 even while the robot 11 is travelling.

Peripheral units 21, 22, 23, 24 and 25 shown in FIG. 2 are designed to perform operations, such as, for example, dimension measuring, oil feeding, tightening threadable connections, force fitting, shrinkage fitting, etc., which represent operations the robot 11 is unable to perform.

Figure 6:
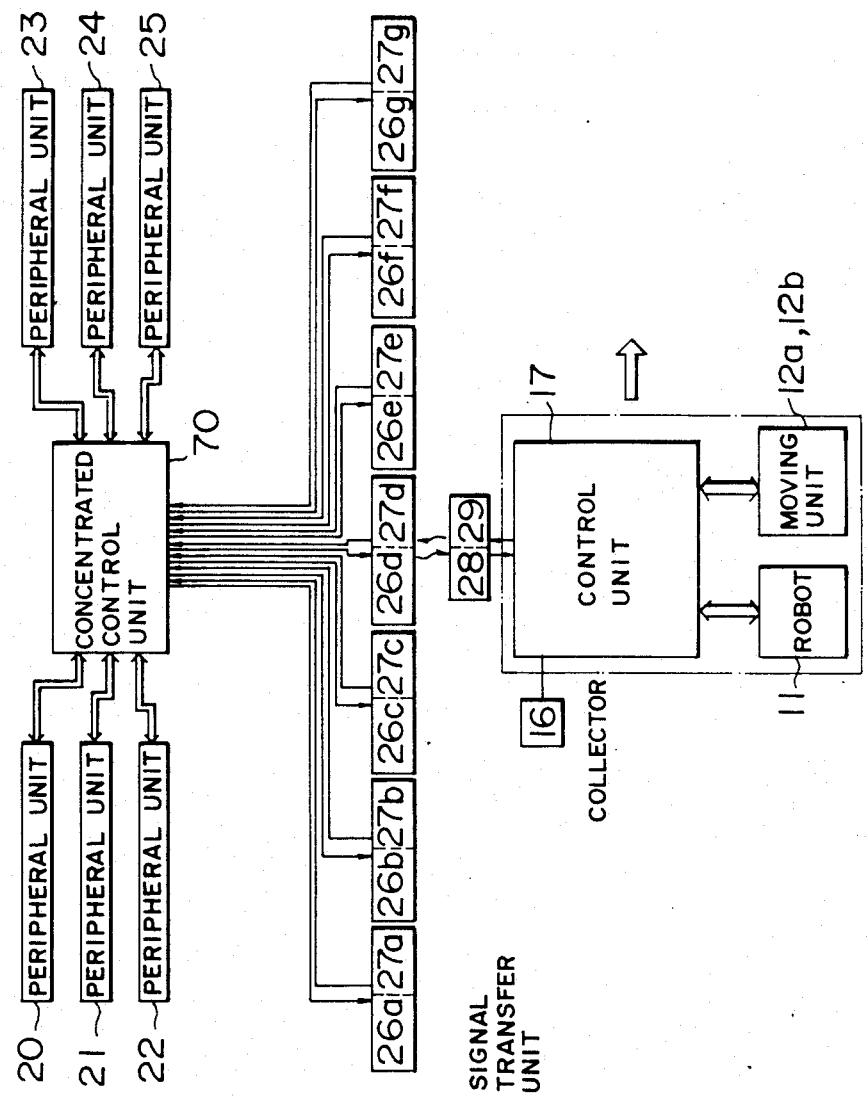
FIG. 6 is a diagrammatic representation of the relationship between the control unit, concentrated control unit and peripheral units.

A signal given by a concentrated control unit 70 for initiating assembling or working operations to be performed by the robot 11 and a signal given thereby for selecting the type of assembling or working operation to be performed by the robot 11 are supplied through signal transfer units 26 shown in FIG. 3 to the control unit 17 which actuates the robot 11 to perform a predetermined type of assembling or working operation corresponding to each position. Upon completion of the assembling or working operations by the robot 11, a signal is issued by the control unit 17 and supplied through a signal transfer units 26a–26g, 27a–27g, 28 and 29 to the concentrated control unit 70, which supplies, through the signal transfer units 26a–26g, 27a–27g, 28 and 29 to the control unit 17, a signal for initiating the operation of the moving units 12a, 12b and indicating how far the moving units 12a, 12b should travel. Thereupon the control unit 17 produces a drive signal for driving a motor 38 which causes the moving units 12a, 12b to travel to a predetermined position and to stop thereat. When it is necessary to synchronize the operation of the tray 20 with that of the robot 11, a command for robot-tray synchronized operation, for example, for the section Q-R shown in FIG. 2, is issued by the concentrated control unit 70 and transmitted to the control unit 17 through the signal transfer units 26a and 28, so that an electrically-operated cylinder 41 is actuated (operation a) and the moving units 12a, 12b are started up (operation b) to operate the tray 20 and robot 11 in synchronism with each other. Upon receiving an instruction from the control unit 17, the robot 11 holds a part 18a or 18a' placed in different positions on the tray 20 and moves the same to the assembling jig 14a to place it thereon (operation c1 or c2), and then holds a part or component 18b or 18b' placed in different positions on the tray 20 and moves the same to the assembling jig 14a to assemble the same thereon (operation d1 or d2). Following the assembling, as the moving units 12a and 12b move to a position in which they are juxtaposed against the peripheral unit 21, signals supplied through the signal transfer units 26a, 27a, 28 and 29 and response signals from the control unit 17 bring the moving units 12a and 12b to a halt, and the robot 11 holds the parts or components 18a or 18a' and 18b or 18b' and transfers the parts or components to the peripheral unit 21 (operation e1 or e2). The part or component 18a or 18a' or 18b or 18b' has, for example, the dimensions thereof measured by the peripheral unit 21. Upon completion of measurements by the peripheral unit 21, a signal for starting up the robot 11 is supplied from the concentrated control unit 70 through the signal transfer units 26b, 27b, 28 and 29 to the control unit 17 which produces a response signal. The robot 11 is thus started up and caused, in accordance with a program stored in a ROM 72 (FIG. 6) of the control unit 17, to grip the parts 18a or 18a' and 18b or 18b' (operation f1 or f2). At the same time, the concentrated control unit 70 issues a signal for initiating the travel of the moving units and supplies the same through the signal transfer units 26a, 27b, 28 and 29 to the control unit 17. Thus, the motor 38 for driving the moving units 12a and 12b is actuated (operation b') to move the moving units 12a, 12b to a position in which they are juxtaposed against the peripheral unit 22 and brings the same to a halt by the signals from the signal transfer units 26c, 27c, 28 and 29. At the same time, the concentrated control unit 70 issues a signal for starting up the robot 11 and supplies the same through the signal transfer units 26c, 27c, 28 and 29 to the control unit 17. Thus, the robot 11 is started up and caused, in accordance with the program stored in the ROM 72 of the control unit 17, to transport the part or component 18a, or 18a' or 18b or 18b' gripped thereby to the peripheral unit 22 (operation g1 and g2) to, for example, feed oil thereto. While the oil feeding operation is being carried out, a robot startup signal from the concentrated control unit 70 starts up the robot 11, which grips a part or component 18c or 18c' placed in different positions on the tray 20 and places same on the assembling jig 14b (operation h1 or h2). After the oil feeding operation, performed by the peripheral unit 22, is finished, the robot 11 grips the part or component 18a or 18a' or 18b or 18b' on the peripheral unit 22 (operation i1 or i2), and, at the same time, the moving units 12a and 12b start moving (operation b). At the same time, the robot 11 transports the part or component 18a or 18a' or 18b or 18b' to the assembling jig 14b and assembles the same on the part or component 18c or 18c' (operation j1 or j2). The moving units 12a, 12b stopped by the signals from the signal transfer units 26d, 27d, 28 and 29, when the moving units 12a, 12b reach a position in which they are juxtaposed against the peripheral unit 23, and the robot 11 grips, in accordance with the program stored in the ROM 72 of the control unit 17, the parts or components 18a or 18a', 18b or 18b' and 18c or 18c' assembled on the assembling jig 14b and transports the same to the peripheral unit 23 (operation k1 or k2) which performs, for example, a threadable connection tightening operation.

The signal transfer units each comprise a light-emitting diode 26a–26g, a light projector 29 a phototransistor 27a–27g and 28 which is a light acceptor. Transfer of signals can be achieved merely by bringing the light-emitting diodes 26a–26g and 29 face to face with the respective phototransistors 27a–27g and 28 without bringing them into contact with one another. Thus, it is possible to effect transfer of signals as the light emitting diodes 26a–26g and 29 pass by the respective photodiodes 27a–27g and 28, even if they are moving. The signal transfer units 26a–26g and 27a–27g are located in predetermined positions and effect transfer of signals each time the signal transfer units 28 and 29 pass by the signal transfer units 26a–26g and 27a–27g, to enable the robot 11 and moving units 12a, 12b to perform predetermined operations. More specifically, the signal transfer units 26a–26g and 28 supply signals to and receive the same from the concentrated control unit 70, and the signal transfer units 27a–27g and 29 supply signals to and receive the same from the control unit 17.

Figure 4:
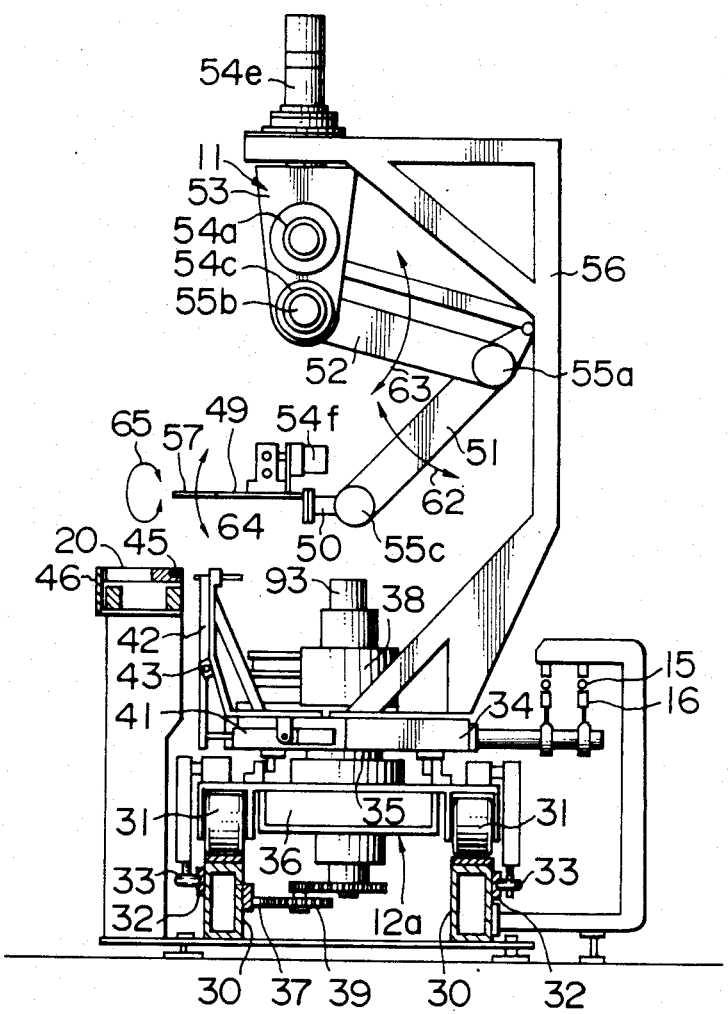
FIG. 4 is a side view of the robot shown in FIG. 2.
Figure 5:
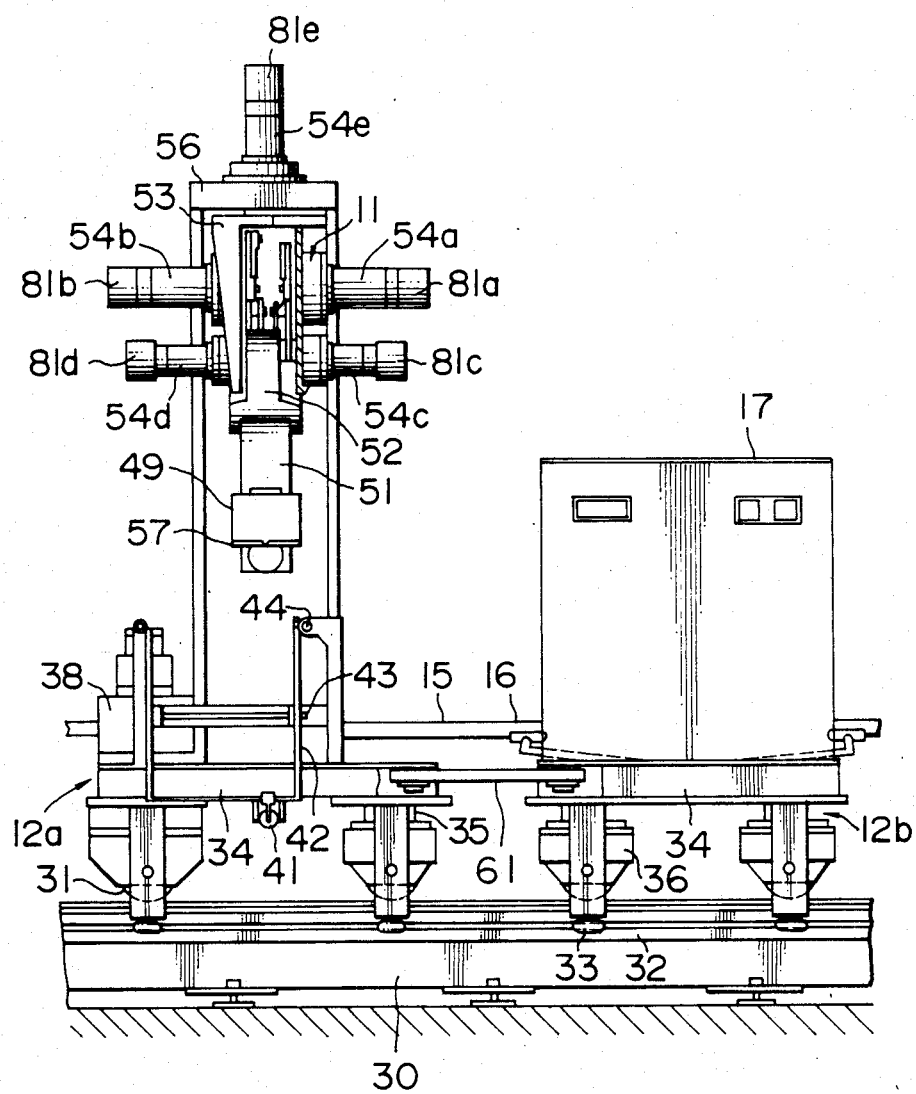
FIG. 5 is a front view of the robot shown in FIG. 4.

The assembling robot 11, as shown most clearly in FIGS. 4 and 5, includes wheels 31 moving along rails 30 located, and side wheels 33 moving along V-groove rails 32 formed on the sides of the rails 30 while being maintained in engagement therewith. The moving unit 12a includes a truck 34, and two bogies 36, connected to the truck 34 through a shaft 35 for swing movement thereabout, with the truck 34 being displaced by a rack 37 and a pinion 39 located between the rails 30 and operated by a pinion 39, driven by the drive motor 38, in meshing engagement with the rack 37. During travel, the weight of the moving unit 12a and of the robot 11 is borne by the wheels 31, with a hunting movement and floating movement of the moving unit 12a being prevented by the side wheels 33. Power is supplied to the moving unit 12a through commercially available trolley wires 15 and collectors 16. A commercially available elecrically-operated cylinder 41, secured to the truck 34, is reciprocated as a pin 44 is is reciprocated by the pivotal movement of a link 42 about a pivot 43, and the pin 44 is slidably engaged in an opening 45 formed on one side of the tray 20. As the electrically-operated cylinder 41 moves forwardly, the other side of the tray 20 is forced against a side guide 46 through the pin 44, to join or connect the track 34 with the tray 20 whereby the tray 20 is joined or connected to the robot 11. With the moving unit 12a travelling on the rails 30, the robot 11 and tray 20 can move as a unit.

As the electrically-operated cylinder 41 moves rearwardly, the pin 44 is released from sliding engagement in the opening 45, and the tray 20 is released from engagement with the side guide 46, so that the tray 20 is separated from the robot 11.

As shown in FIGS. 4 and 5, the robot 11 includes a hand 49, a wrist 50, a forearm 51, an upper arm 52 and a base 53. The forearm 51 is driven by a motor 54a to move in a pivotal movement about a joint 55a in a direction of an arrow 62. The upper arm 52 is driven by a motor 54b to move in pivotal movement about a joint 55b in the direction of an arrow 63. The wrist 50 is driven by motors 54c and 54d to move in pivotal and rotary movements in the direction of arrows 64 and 65, respectively, about a joint 55c. The motors 54a, 54b, 54c and 54d and the base 53, supporting the upper arm 52, are suspended from a hanger 56 and driven by a motor 54e for swinging movement about a vertical axis. The hanger 56, supporting the robot 11, is secured to the truck 34 for movement with the moving unit 12a. The hand 49 is secured to the wrist 50 and includes a gripper 57 opened and closed by a motor 54f, to freely grip and release a part or component. As apparent, the robot 11 is versitile and has 5 degrees of freedom including one degree of freedom for the forearm 51, one degree of freedom for the upper arm 52, one degree of freedom for swinging movement, and two degrees of freedom for the wrist 50.

The control unit 17 includes a servo power source 98 for driving the drive motor 38, electrically-operated cylinder 41 and motors 54a–54f by power supplied through the collectors 16, a micro-processor 71 for effecting arithmetic control, and a programmable read-only-memory ROM 72 and other units storing a program for the operation of the robot 11. The control unit 17 effects control of the robot 11 and moving units 12a, 12b and control of synchronous movement of the tray 20 with the operation of the robot 11.

Figure 7:
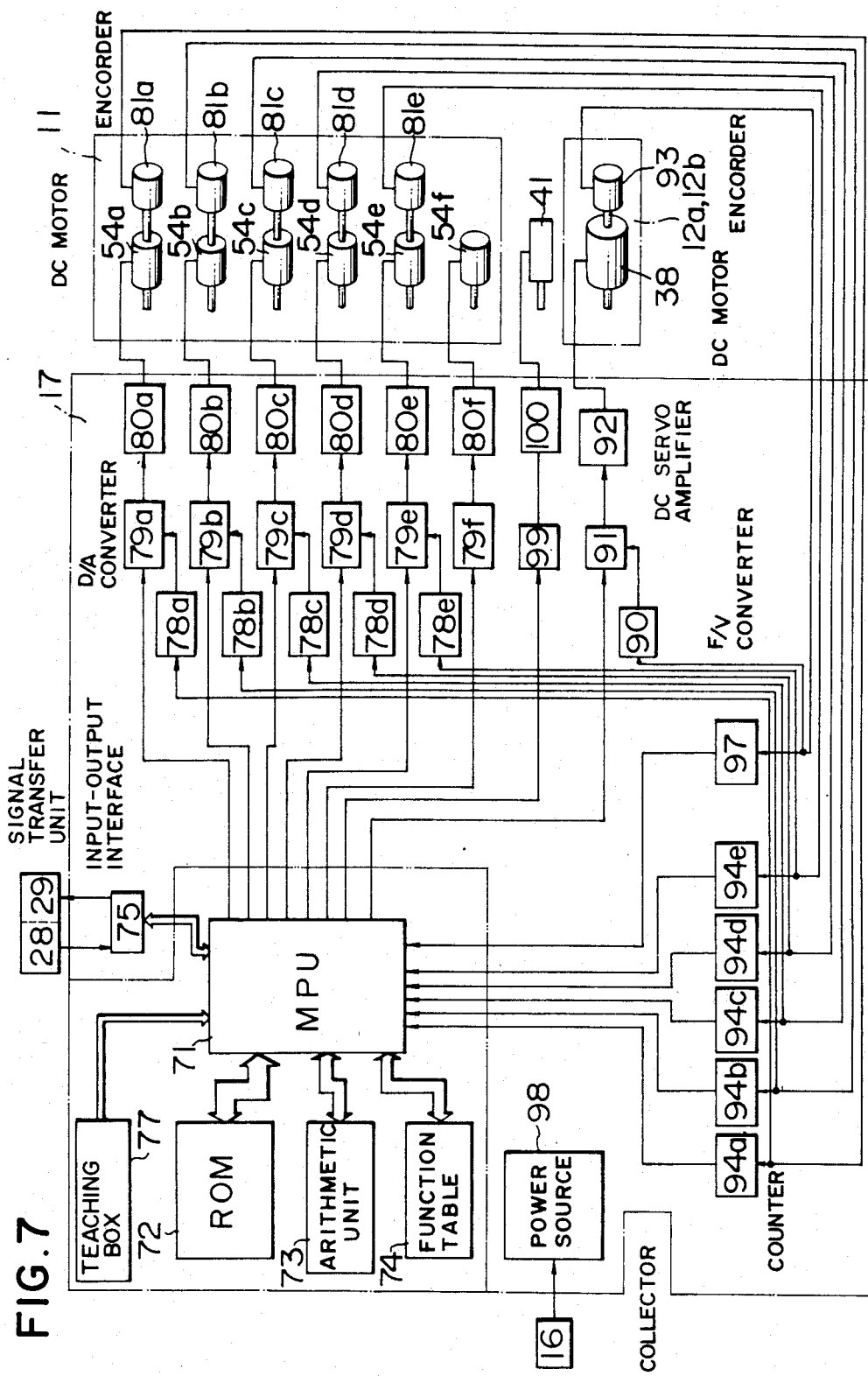
FIG. 7 is a block diagram showing the concrete construction of the control unit and the relationship between the control unit and the driven means including the robot and moving units.

More specifically, the control unit 17 includes, as shown in FIG. 7, a memory (ROM) 72 for storing information on the operation data (sequence data, point data, etc.) in conformity with the types A, B, C and D of the products handled by the robot 11. This is, for example, the type A of products is assembled or worked in accordance with the operation data or a program A' (a, b, c1, d1, e1, f1, b, g1, h1, i1, b, j1, k1, l, m1, b, n1, o1, b, p1, b): the type B of products is assembled or worked in accordance with the operation data or a program B' (a, b, c2, d1, e2, f2, b, g2, h2, i2, b, j2, k1, l, m2, b, n2, o2, b, p2, b); the type C of products is assembled or worked in accordance with the operation data or a program C' (a, b, c1, d2, e1, f1, b, g1, h1, i1, b, j1, k1, l, m1, b, n1, o1, b, p1, b); and the type D of products is assembled or worked in accordance with the operation data or a program D' ( a, b, c2, d2, e2, f2, b, g2, h2, i2, b, j2, k1, l1, m2, b, n2, o2, b, p2, b). The control unit 17 further includes an input-output interface 75 for handling transfer of signals from outside through the signal transfer units 28 and 29, D/A converters 79a–79f, 99 and 91 for converting digital signals to analog signals, an arithmetic unit 73 for calculating speeds and paths of travels, a function table 74, counters 94a–94e, and 97 for calculating pulse signals from rotary encoders 81a–81e and 93. F/V converters 78a–78e and 90 for obtaining velocity signals from the pulse signals from the rotary encoders 81a–81e and 93, a micro-processor unit (MPU) 71 for performing the programmed operations on the movements of the robot 11 and moving units 12a, 12b and for effecting control of such operations, DC servo amplifiers 80a–80f and 92 for driving the DC motors 55a–55f and 38, respectively, a drive amplifier 100 for driving the electrically-operated cylinder 41, a power source 98 for supplying power to the various types of elements, and a teaching box 77 for teaching the robot 11 by moving its hand 49 in X, Y and Z directions.

As a signal is inputted from the concentrated control unit 70 through the signal transfer units 26a, 27a, 28 and 29 indicating one of the types A, B, C and D of the articles to be produced, selection of one of the operations programmed in the ROM 72 of the control unit 17 is carried out. Signals for stopping the moving units 12a, and 12b and for actuating the elements of the program selected from the program A' (a, b, c1, d1∼b), the program B' (a, b, c2, d1∼b), the program C' (a, b, c1, d2∼b) and the program D' (a, b, c2, d2∼b) are inputted, so that the MPU 71 stops the moving units 12a and 12b in each station and performs an arithmetic operation on the program elements of a, b, c1, c2 . . . p1 and p2 based on the current values of coordinates fed back from the counters 84a–94e and 97 by using the arithmetic unit 73 and function table 74, so as to drive the DC motors 55a–55f of various axes of the robot 11. Thus the operations a, b, c . . . p1 and p2 are performed and the article A, B, C or D is produced. Feedback of velocity is effected by the F/V converters 78a–78e and 90, to enable the DC motors 55a–55e to be driven by instructions from the servo amplifiers 80a–80e, respectively, in time for the velocity instructions supplied to the D/A converters 79a–79e and 91. Thus, the counters 94–94e and 97 are driven until they indicate predetermined values of coordinates.

The teaching box 77 is used for writing to the ROM 72 the coordinates of operation points stored in the counters as the robot 11 is moved to the specific operation points, so that the robot 11 can perform various operations.

The control unit 17 is secured on the moving unit 12b of the same construction as the moving unit 12a supporting the robot 11 thereon which can move on the rails 30 like the moving unit 12a. It is to be noted that the moving unit 12b has no drive section including the rack 37, motor 38 and pinion 39, and is connected through a connecting rod 61 to the moving unit 12a supporting the robot 11 and having the drive section. Thus the robot 11 and control unit 17 can move as a unit.

The robot 11 is driven in synchronism with the try 20 for movement in the section Q-R shown in FIG. 2 on the moving units 12a and 12b, and performs assembling operations by successively gripping the parts or components 18a or 18a', 18b or 18b', and 18c or 18c' placed on the tray 20 and transferring the same to the assembling jigs 14a and 14b. The assembled parts or components 18a or 18a', 18b or 18b', and 18c or 18c' are transferred to the peripheral units 21, 22 and 23 for performing dimensions measuring, oil feeding and threaded connection tightening operations, respectively. The empty tray 20 is separated from the robot 11 (operation l) at the position R and transported by the tray conveyor 19 to a loading station for placing new parts or components 18a or 18a', 18b or 18b' and 18c or 18c' thereon. When loaded, the tray 20 is moved to the position Q.

Meanwhile, the robot 11 lifts the assembled parts or components 18a or 18a', 18b or 18b' and 18c or 18c' (operation m1 or m2), moves along the track 13 together with the moving units 12a, 12b (operation b) and stops in front of the peripheral unit 24 by the signals from the signal transfer units 26f, 27f, 28 and 29. Thus, the robot 11 transfers the assembled parts or components, as they were held at the peripheral unit 23 or as they were placed on the assembling jig 14b, to the peripheral unit 24 (operation n1 or n2). The peripheral unit 24 performs the operation of force fitting another part to the assembled parts or components 18a or 18a', 18b or 18b', and 18c or 18c'. Upon completion of this operation, the concentrated control unit 70 issues a signal for actuating the control 17 to cause, in accordance with the operation programs stored in the control unit 17, the robot 11 to perform the operation of holding the assembled parts or components that have been operated on (operation o1 or o2) and the moving units 12a and 12b to start travelling (operation b) and stop in front of the peripheral unit 25 by the signals from the signal transfer units 26g, 27g, 28 and 29. The assembled parts or components are transferred by the robot 11 to the peripheral unit 25 (operation p1 or p2). In the peripheral unit 25, another part or component is shrink fitted to the assembled parts to produce the completed product A, B, C or D. Thereafter, the moving units 12a and 12b are started up (operation b) and stop in front of the signal transfer units 26a and 27a after moving thereto. Information on the type of article to be produced in the next operation as to whether it is A, B, C or D is inputted to the control unit 17 from the concentrated control unit 70 through the signal transfer units 26a and 28, and the control unit 17 selects the program for one type selected from those of A', B', C' and D' written to the ROM 72.

The control unit 17 has been shown and described as having built therein the MPU 71, ROM 72, arithmetic unit 73, function table 74 and teaching box 77. It is to be understood that the invention is not limited to this specific form of the control unit 17 and these elements may be stationarily mounted outside in a manner similar to the concentrated control unit 70, in place of being movably supported on the moving unit 12a. The MPU 71 of the control unit mounted outside the assembly line may be connected to the D/A converters 79a–79f, 99 and 91 and the counters 94a–94f and 97 through radio signal transfer units. In this case, it is necessary to provide the control unit 17 with the amplifiers 80a–80f and 92 for driving the motors 55a–55f and 38, respectively, and the power soruce 98 for the motors. The assembling jig 14a, 14b may be of the type disclosed in U.S. Ser. No. 185,915, now U.S. Pat. No. 4,367,591.

Figure 8:
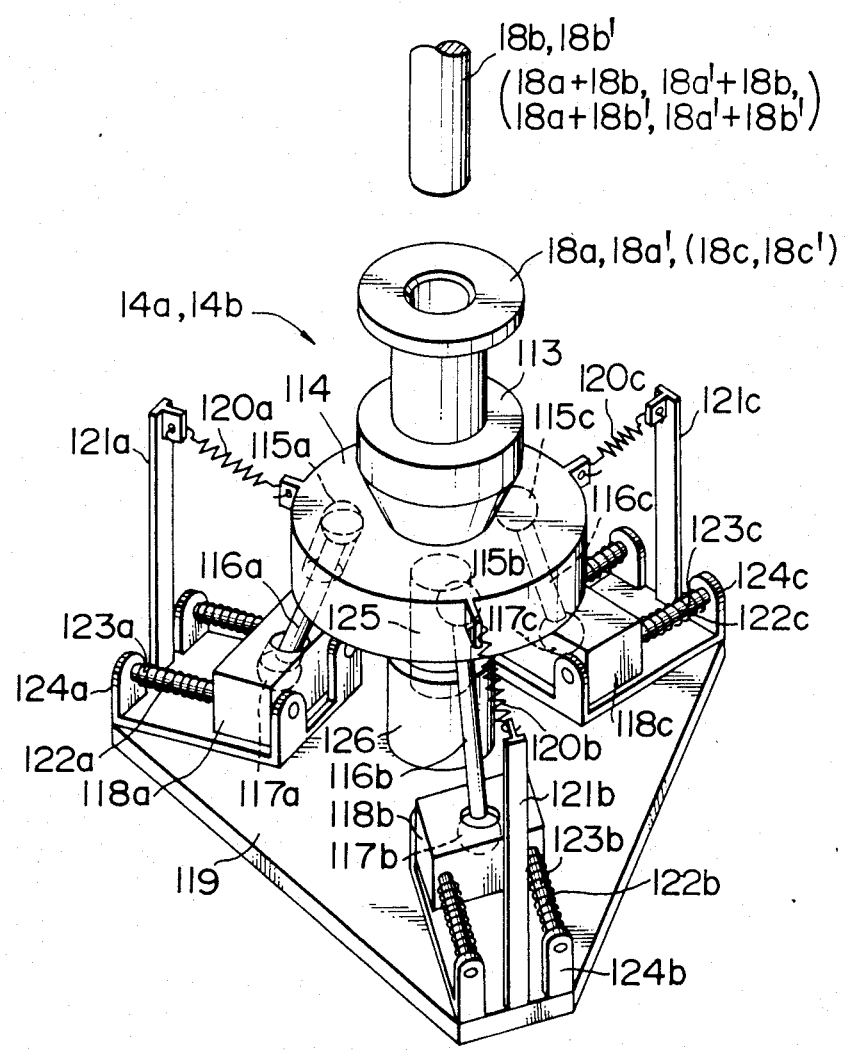
FIG. 8 is a perspective view of one constructional form of the assembling jig mounted on the moving unit.

As shown in FIG. 8, the assembling jig 14a, 14b comprises a stationary base 119 having secured thereto slider guides 123a, 123b and 123c and slider stoppers 124a, 124b and 124c. Sliders 118a, 118b and 118c slide along the slider guides 123a, 123b and 123c, respectively, in such a manner that the sliding movements of the sliders 118a, 118b and 118c are regulated by the slider stoppers 124a, 124b and 124c, respectively. Normally the sliders 118a, 118b and 118c are urged by the biasing forces of springs 122a, 122b and 122c, respectively, against one end of the respective stoppers 124a, 124b and 124c. Thus, when a force is exerted on the sliders 118a, 118b, and 118c, the sliders are prevented from sliding if the force is below a certain value. That is, the sliders 118a, 118b and 118c act non-linearly. By rendering the springs 122a, 122b and 122c operative to perform a non-linear operation, it is possible to widen the range of fitting operations.

The sliders 118a, 118b and 118c have lower ball joints 117a, 117b and 117c respectively connected thereto and upper ball joints 115a, 115b and 115c connected to a movable base 114. The lower ball joints 117a, 117b and 117c are connected to the upper ball joints 115a, 115b and 115c through links 116a, 116b and 116c, respectively. The stationary base 119 has secured thereto upper spring retaining members 121a, 121b and 121c which are connected to the movable base 114 through upper springs 120a, 120b and 120c, respectively. The movable base 114 has secured thereto an inner operation regulating member 125 and the stationary base 119 has secured thereto an outer operation regulating member 126, and the regulating members 125 and 126 regulate the movements of the movable base 114 in such a manner that the movable base 114 operates relative to the stationary base 119 only in a region of a gap between the two regulating members 125 and 126.

The resilient support system described above comprises three sets of support sections each including one of the sliders 118a, 118b and 118c, links 116a, 116b and 116c, upper springs 120a, 120b and 120c and springs 122a, 122b and 122c which are mounted between the stationary base 119 and the movable base 114.

A hole member 18a, 18a' (18c, 18c') is secured to the movable base 114 through a hole member retainer 113. A shaft 18b, 18b' (18a+18b, 18a'+18b, 18a+18b', 18a'+18b') has only to be moved downwardly to be fitted in the hole member 18a, 18a' (18c, 18c').

The system shown in FIG. 8 has a three-dimensional spatial mechanism having six degrees of freedom. It will be understood that since the hole member retainer 113 should be replaced by suitable ones depending on the parts, replacements thereof may be effected either manually or by means of the robot 11.

From the foregoing description, it will be appreciated that the invention enables a highly versatile robot 11 to travel along a predetermined closed loop track 13 and to perform an assembling or working operation during its travel. Thus, the invention permits a reduction in transfer time or time that creates no added value to the articles, and a cycle time of the assembly or working operation is considerably reduced. Additionally, the invention permits the number of robots 11 used for performing the desired operation to be minimized.

The invention also enables the production system to cope with a variation in the number of articles to be produced which tends to occur in a production system in which a large number of types of products are produced in small numbers, by merely increasing or decreasing the number of robots 11.

In the invention, 11 travel along a closed loop track in one direction. Thus, by moving the robots 11 one after another and allowing same to make a complete circuit along the closed loop track 13 without interfering with one another, it is possible to carry out the production of a large number of types of articles in small numbers with increased efficiency.

What is claimed is:

1. A working/assembling system comprising:
   an endless track means formed in a closed loop;
   moving means travelling on said endless track means and having drive motor means for actuating said moving means;
   at least one programmable robot having an operating arm and a drive motor means for actuating the operating arm, the robot being supported on said moving means for performing working/assembling operations;
   at least one working/assembling jig located on the moving means;
   an electric power supply means extending along said endless track means;
   a programmable control unit supported on said moving means and comprising at least memory means for storing information about sequential operations in conformity with types of products to be processed by the robot, a plurality of amplifiers for driving the respective drives motor means for actuating said arm constituting said robot, teaching means for teaching said memory means coordinates of specific operation points of the robot so that the robot performs each of said sequential operations, and data processing means arranged to read out the information on the sequential operations in conformity with the types of products stored in the memory means and to drive the amplifiers so as to cause the robot to perform the sequential operations, whereby said robot is caused to travel on said endless track by movement of said moving means thereon and to perform working/assembling operations while having its operations controlled by said control unit;
   means mounted on said moving means for slidably electrically connecting said electric power supply means and for supplying the electric power to the control unit;
   a concentrated control unit not mounted on said moving means but arranged to transmit control signals to said programmable control unit for instructing said programmable control unit as to which sequence of operations is to be selected from a predetermined plurality of sequences of operations stored in said memory means;
   signal receiving means mounted on said moving means;
   signal transmitting means for transmitting said signals from said concentrated control unit to the programmable control unit through said signal receiving means, said signal transmitting means comprising a plurality of signal transmitting units mounted at predetermined spaced positions along said endless track means;
   a path of conveyance extending along at least a portion of said track means, at least one member being conveyed along said path of conveyance in synchronism with said moving means with workpieces or parts on said member, whereby said programmable robot hands said workpieces or parts on said member and works/assembles said workpieces or parts by using said working/assembling jig in accordance with control instructions from the programmable control unit while the robot moves with said moving means along the endless track means; and
   peripheral units located along said endless track means for performing working/assembling operations, said concentrated control unit operating to obtain synchronization of the operations of said peripheral units with those of said robot.

2. A working/assembling system as claimed in claim 1, wherein said data process means includes a microcomputer means reading out information on operations stored in the memory means.

3. A working/assembling system as claimed in claim 2, further comprising signal receiving units connected to said control unit and mounted on said moving means, and signal transmitting units mounted in a predetermined position along said endless track for giving instructions through said signal receiving units to said control unit to start up the robot and cause same to perform predetermined operations.

4. A working/assembling system as claimed in claim 1, wherein said robot has at least five degrees of freedom.

5. A working/assembling system as claimed in claim 1, further comprising signal receiving and transmitting units for supplying a robot startup signal to said control unit as soon as it receives a robot startup signal from said concentrated control unit.

6. A working/assembling system as claimed in claim 5, wherein said signal receiving and transmitting units comprise optical signal receiving and transmitting units comprising signal receiving members and signal transmitting members, said signal transmitting members being located in a predetermined position along said endless track and said signal receiving members being located on said moving means.

* * * * *